Nov. 22, 1927.                                              1,650,338
                        G. FORNACA
              HYDRAULIC BRAKE FOR MOTOR VEHICLES
                  Filed Feb. 27, 1923        3 Sheets-Sheet 1

Inventor:
Guido Fornaca
By Emil Bönnelycke
                Attorney

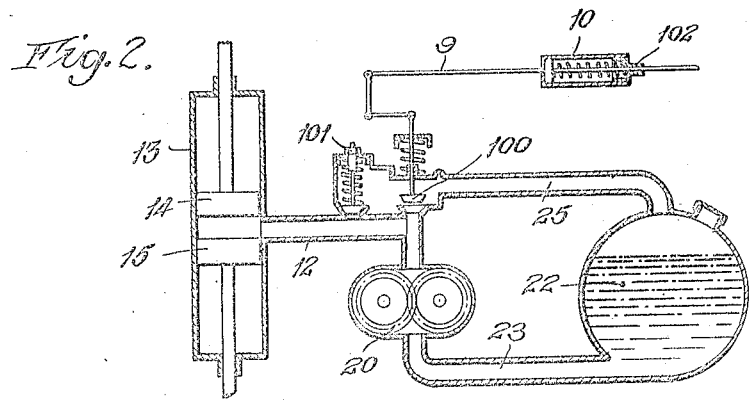
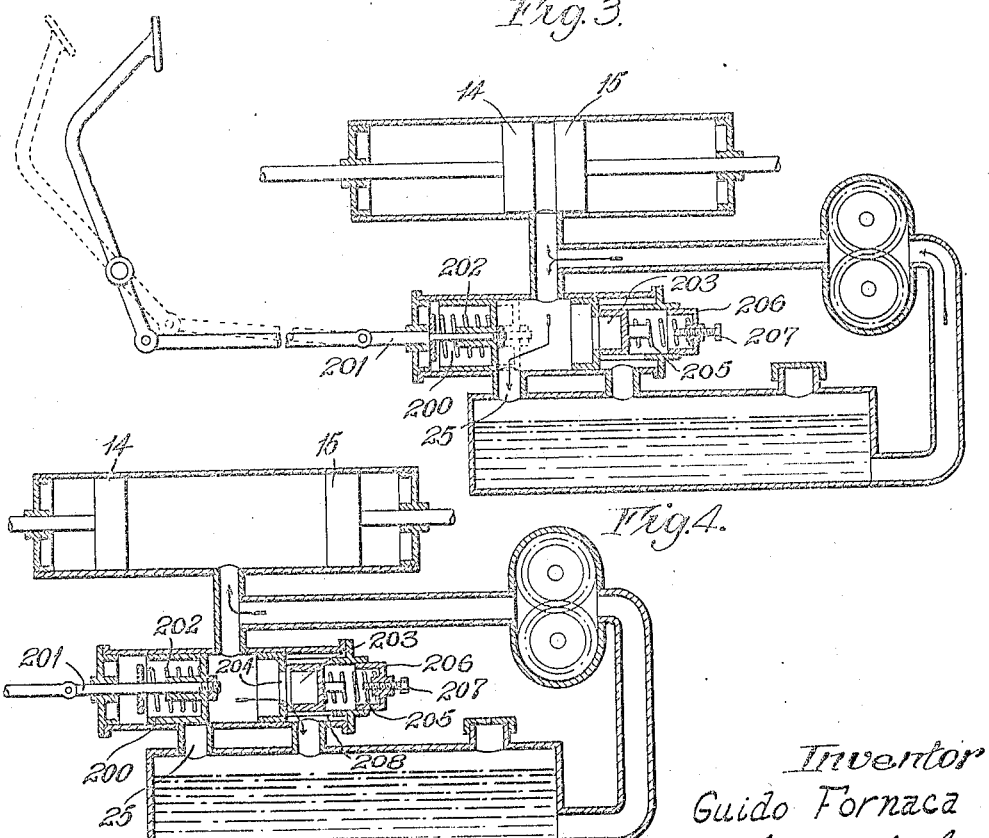

Nov. 22, 1927.  
G. FORNACA  
1,650,338  
HYDRAULIC BRAKE FOR MOTOR VEHICLES  
Filed Feb. 27, 1923   3 Sheets-Sheet 3

Inventor:  
Guido Fornaca.  
By Emil Bönnelyke  
ATTORNEY

Patented Nov. 22, 1927.

1,650,338

UNITED STATES PATENT OFFICE.

GUIDO FORNACA, OF TURIN, ITALY.

HYDRAULIC BRAKE FOR MOTOR VEHICLES.

Application filed February 27, 1923, Serial No. 621,670, and in Italy February 28, 1922.

This invention refers to a novel system of hydraulically working the brakes of motor vehicles, the inertia of the moving vehicle being utilized to actuate the brakes.

The arrangement consists essentially of a pump worked by the motor of the vehicle and having its inlet in communication with a reservoir containing some suitable liquid, for example oil or glycerine, and its outlet or discharge in communication with one or more cylinders for operating the brakes. In the discharge piping is a valve adapted to be actuated by the ordinary means for working the brakes by hand or foot. Normally the valve is kept open and places the discharge piping in communication with the aforesaid reservoir so that the pump runs idly. When it is desired to apply the brakes the valve is closed by means of the usual pedal or hand lever whereby the liquid from the pump is forced into the brake cylinder, or cylinders, and displaces the piston, or pistons, which in their turn actuate the brakes on the vehicle wheels.

There may be as many brake cylinders as there are brakes, in which case the pistons of each cylinder are connected to the corresponding brakes by means of a simple system of levers and rods. The brakes are caused to act automatically to stop the vehicle by an effort proportionate to the speed of the latter, and, at the same time, automatic compensation of the brakes is effected.

To avoid excessive and useless pressure in the operation of the brakes, the rod which effects the closing of the control valve is provided with an adjustable elastic member which allows the valve to open when the piston of each brake cylinder has reached the end of each stroke or when the pressure acting thereon exceeds the limit required for the braking effort.

According to a modified constructional form, the operating valve consists of a resilient valve with a cylindrical piston, which, when closing the liquid inlet and thereby causing the liquid to flow into the brake cylinders, is subjected to a thrust proportionate to the unitary pressure of the liquid; and this pressure is transmitted to the pedal so that the driver is able to ascertain the pressure of the liquid and to adjust the braking action. In the valve body is situated a pressure reducing valve which can be adjusted by adjusting the tension of its spring, so as to allow the maximum stress to be exerted on the brakes at the minimum speed of the vehicle, without, however, jamming the wheels. The valve stroke can be limited by an adjusting screw so that a braking action proportionate to the vehicle speed will be obtained. The proportion between the braking action and the vehicle speed is maintained up to a certain speed limit by the increase in tension of the valve spring, and beyond this limit by stopping the valve motion so that, the outlet through the small outlet ports not being proportionate to the increased supply of the pump, the pressure increases rapidly and in accordance with the increased speed. The power due to the kinetic energy of the wheels which at high speeds is considerable is thus eliminated.

Applications of the system according to the invention are illustrated, by way of example, in the accompanying drawings, wherein:

Fig. 2 is a view of the pump and connected parts on a larger scale.

Figure 3 is a longitudinal section showing a modified form of the brake operating valves when out of work and Figure 4 is a section similar to Figure 3, wherein the valves are shown in the braking position at a middle speed.

Figure 1:
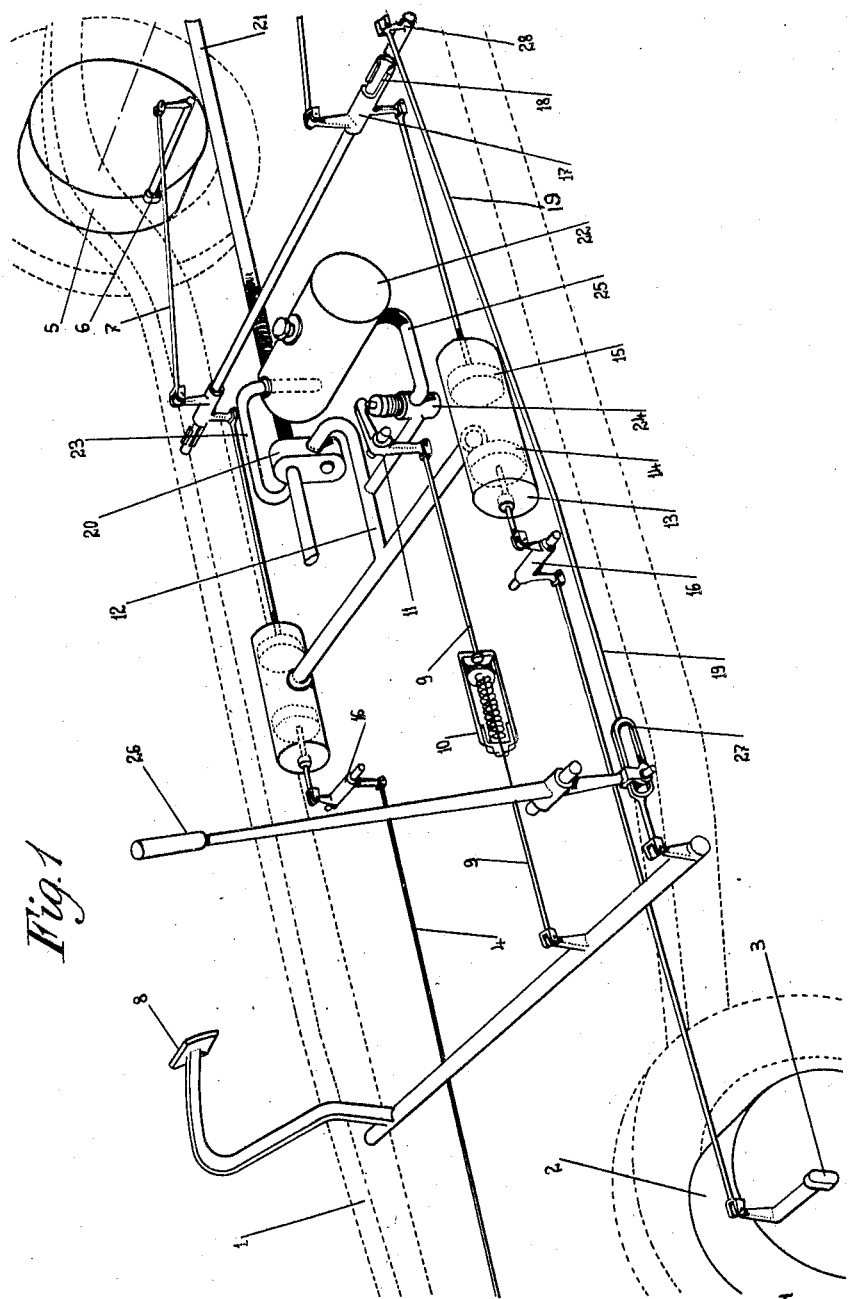
Fig. 1 is a perspective view of one arrangement for hydraulically operating the brakes of a motor vehicle.
Figure 6:
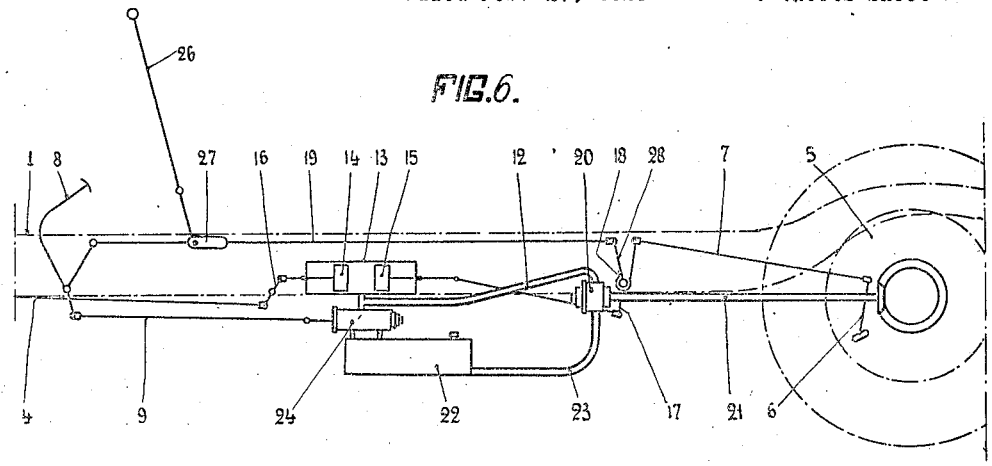
Figs. 5 and 6 are diagrammatic views in plan and side elevation, respectively, showing the application of the above modification.
Figure 5:
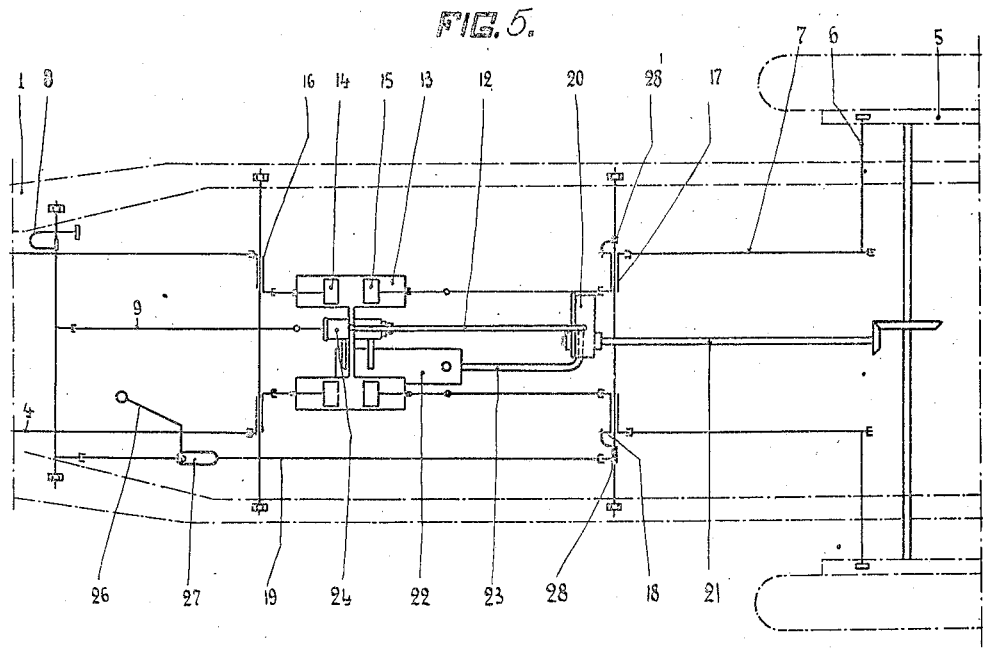

In Figs. 1 and 2, 1 is the chassis of a motor vehicle, 2 the brake drums on the front wheels, 3 the brake levers, and 4 the rods connected to the levers; 5, 6 and 7 show respectively the drums, levers and rods of the rear brakes. The rods 4 and 7 are connected respectively to levers 16 and 17 which, in their turn, are put in connection by means of some suitable system of connecting rods, with pistons 14 and 15 slidable in brake cylinders 13 in communication by a pipe 12 with the discharge side of a pump 20 of any suitable type and communicating on its inlet side, with a reservoir 22 for holding the liquid serving for the transmission of force, by means of a suction pipe 23. Branching from the discharge or delivery pipe 12 is a secondary pipe 25 leading back to the reservoir 22 and fitted with a group of valves 24, comprising a safety valve 101 (Fig. 2) which opens automatically whenever the internal pressure exceeds a predetermined limit, and a control valve 100 which is normally kept open so that the liquid delivered by the pump simply returns to the reservoir without doing any work. The control valve 100 is arranged to be closed by actuating a pedal 8 connected to the valve by a rod 9 which is provided with a spring member 10 so that the valve 100 will be forced to its seat gradually during the braking operation. Adjustment of the member 10 can be effected by means of a nut 102. The pump 20 is operated by the back wheels of the motor vehicle through the transmission shaft 21 and it ceases to work when the wheels stop.

In addition to the hydraulic braking arrangement described, the rear brakes can also be actuated directly by the pedal 8 or by a hand lever 26. To this end the lever 17 has a clutch 18, by means of which it can be worked by a lever 28 connected to the pedal and the hand lever by a rod 19. With this arrangement the lever 28 is not affected when the braking is effected hydraulically by displacement of the pistons 14 and 15. The rod 19 is slotted at 27 to receive the lower extremity of the hand lever 26 so that displacement of the rod by the pedal does not produce any displacement of the lever 26 although the rod can be actuated by the hand lever.

The operation of the hydraulic braking arrangement is as follows:

When pressure is exerted on the pedal 8, the rod 9 closes the valve 100 under a pressure proportionate to the action exercised on the pedal, and the pistons 14, 15 in the brake cylinders 13 then come into action under the influence of the oil or other liquid delivered by the pump. When the pistons are at the end of their strokes, as the pump continues to deliver oil, the pressure increases until a position of equilibrium for the valve is obtained. The valve is then forced open by the liquid, which exercises a force corresponding to the pressure exerted on the valve. The spring member 10, fitted in connection with the operating rod 9 ensures a partial lifting of the valve to prevent the pressure rising to such an extent as to produce a braking action greater than desired.

If it is desired to increase the braking effect, the pressure on the pedal is increased and, as the spring member 10 is then further compressed, a higher pressure will be required inside the cylinders before the valve 100 can open. That is equivalent to saying that the limit of the hydraulic pressure is determined by the pressure of the foot on the pedal. It is thus possible to graduate the action of the brakes according to requirements.

When the vehicle stops, the action of the hydraulic working device weakens and eventually ceases, as the pump no longer delivers liquid, and the internal pressure slowly disappears by leakage, but the rear brakes can be maintained operative by actuating the pedal 8 or hand lever 26, whereupon the rod 19 is moved, thus operating the brake shoes through the lever 28 and the clutch 18.

According to the modified form shown in Figures 3 to 6, the brakes are operated by means of a cylindrical slide or piston valve 200 loosely mounted on the stem 201 and subjected to the action of the spring 202 and of a pressure reducing valve 203 which is kept on its seat 204 by a spring 205, the tension of which spring is adjustable by means of the cap 206. The lift of valve 203 can be limited by the adjustable stop screw 207, so as to close more or less the outlet ports 208 when the vehicle speed exceeds a determined limit.

In the position of the valve 200 shown in Figure 3, the oil supplied by the pump flows back to the reservoir 22 through the conduit 25, the section of which is such as to offer a slight resistance.

By pressing the pedal 8 to the position shown by dotted lines in Fig. 3, the valve 200 closes the inlet to the conduit 25 and the oil stored between the pistons 14 and 15 causes the displacement thereof.

When the pressure nearly reaches the limit corresponding practically to the jamming of the vehicle wheels, (which limit preferably will not be reached) the valve 203 previously adjusted by means of the cap 206 acting on the spring 205 opens, preventing the pressure from exceeding a suitable predetermined limit. When the vehicle runs at very high speed, as in the case of racing or touring cars, the braking action required is much greater, as before slowing down the wheels it is necessary to eliminate the kinetic energy which, independently of that of the car, is considerable. The pressure of the liquid, therefore, must rise rapidly to the extent required for obtaining the necessary braking action. This is obtained by limiting the lift of valve (203) by means of the stop screw 207 so that above a certain speed the section of the outlet ports 208 is no longer increased and the resistance opposed thereby to the pump supply provokes the desired increase in pressure as long as the pump runs at a high speed, namely as long as the wheels have not eliminated the greatest part of the kinetic energy acquired.

What I claim is:

1. In a four-wheel brake system for motor cars, the combination, with the front and rear wheels and their individual brakes: of hydraulic cylinder-and-piston mechanism; connections between said mechanism and all the brakes for automatically actuating the latter simultaneously from the former; a reservoir for pressure fluid; a pump; piping connecting the reservoir, hydraulic mechanism and pump; a valve cylinder connected in said piping; a normally-open slide valve in the valve cylinder for causing the fluid to circulate in a closed path through the piping between the pump and the reservoir; and a pedal connected to close the valve and thereby divert the fluid into the hydraulic mechanism to actuate the same, said valve consisting of a cylinder having a working face of such area as to transmit to the pedal the unitary pressure of the fluid in order to warn the driver regarding such pressure and its braking action.

2. In a four-wheel brake system for motor cars, the combination, with the front and rear wheels and their individual brakes: of hydraulic cylinder-and-piston mechanism; connections between said mechanism and all the brakes for automatically actuating the latter simultaneously from the former; a reservoir for pressure fluid; a pump; piping connecting the reservoir, hydraulic mechanism and pump; a valve cylinder connected in said piping; a normally-open slide valve in the valve cylinder for causing the fluid to circulate in a closed path through the piping between the pump and the reservoir; means for closing said valve to divert the fluid into the hydraulic mechanism to actuate the same and to create a pressure therein and in the valve cylinder; a normally-closed pressure reducing valve in said valve cylinder adapted to open automatically when such pressure exceeds a predetermined limit; and an adjustable stop to limit the operation of the reducing valve and thereby provoke a rapid increase in the pressure.

In testimony whereof I affix my signature.

ING. GUIDO FORNACA.